(12) United States Patent
Holden et al.

(10) Patent No.: US 9,500,881 B2
(45) Date of Patent: *Nov. 22, 2016

(54) CONTACT LENSES FOR MYOPIC EYES AND METHODS OF TREATING MYOPIA

(71) Applicant: Brien Holden Vision Institute, Sydney, NSW (AU)

(72) Inventors: Brien Anthony Holden, Sydney (AU); Gregor Schmid, Duluth, GA (US); Padmaja Rajagopal Sankaridurg, Sydney (AU); Arthur Ho, Sydney (AU); Aldo Abraham Martinez Mangos, Johns Creek, GA (US); Percy Fabian Lazon, Sydney (AU); Earl Leo Smith, III, Houston, TX (US)

(73) Assignee: Brien Holden Vision Institute, Sydney, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,962

(22) Filed: Dec. 4, 2014

(65) Prior Publication Data

US 2015/0085247 A1 Mar. 26, 2015

Related U.S. Application Data

(63) Continuation of application No. 13/581,996, filed as application No. PCT/AU2011/000235 on Mar. 3, 2011, now Pat. No. 8,931,897.

(30) Foreign Application Priority Data

Mar. 3, 2010 (AU) .............................. 2010900904

(51) Int. Cl.
 *G02C 7/04* (2006.01)
 *G02C 7/06* (2006.01)

(52) U.S. Cl.
 CPC ............... *G02C 7/044* (2013.01); *G02C 7/041* (2013.01); *G02C 7/047* (2013.01); *G02C 7/063* (2013.01); *G02C 2202/06* (2013.01); *G02C 2202/24* (2013.01)

(58) Field of Classification Search
 CPC ..................... G02C 7/04; G02C 7/041–7/045; G02C 7/047
 USPC ........................... 351/159.05–159.21, 159.79
 See application file for complete search history.

(56) References Cited

U.S. PATENT DOCUMENTS 4,704,016 A 11/1987 De Carle
4,890,913 A 1/1990 De Carle
(Continued)

FOREIGN PATENT DOCUMENTS

CN 101208628 A 6/2008
JP 2000-122007 A 4/2000
(Continued)

OTHER PUBLICATIONS

International Search Report dated Apr. 5, 2011 for PCT/AU2011/000235.
(Continued)

*Primary Examiner* — Darryl J Collins
(74) *Attorney, Agent, or Firm* — Jones Day

(57) ABSTRACT

A contact lens and a method for treating an eye with myopia is described. The contact lens includes an inner optic zone and an outer optic zone. The outer optic zone includes at least a portion with a first power, selected to correct distance vision. The inner optic zone has a relatively more positive power (an add power). In some embodiments the add power is substantially constant across the inner optic zone. In other embodiments the add power is variable across the inner optic zone. While in some embodiments the inner optic zone has a power designed to substantially eliminate lag of accommodation in the eye with myopia, in other embodiments, the add power may be higher.

9 Claims, 5 Drawing Sheets

(56) References Cited

U.S. PATENT DOCUMENTS

| | | | |
|---|---|---|---|
| 4,923,296 | A | 5/1990 | Erickson |
| 5,139,325 | A | 8/1992 | Oksman et al. |
| 5,198,844 | A | 3/1993 | Roffman et al. |
| 5,754,270 | A | 5/1998 | Rehse et al. |
| 5,929,969 | A | 7/1999 | Roffman |
| 6,176,579 | B1 | 1/2001 | Mandell |
| 6,199,982 | B1 | 3/2001 | Oyama et al. |
| 6,286,956 | B1 | 9/2001 | Oyama et al. |
| 6,457,826 | B1 | 10/2002 | Lett |
| 6,543,897 | B1 | 4/2003 | Tung |
| 6,752,499 | B2 | 6/2004 | Aller |
| 7,819,523 | B2 | 10/2010 | Shimojo |
| 7,832,859 | B2 | 11/2010 | Phillips |
| 2004/0085515 | A1 | 5/2004 | Roffman et al. |
| 2005/0041203 | A1* | 2/2005 | Lindacher ............ G02C 7/028 351/159.42 |
| 2008/0128687 | A1 | 6/2008 | Armgarth et al. |
| 2010/0036489 | A1 | 2/2010 | Lindacher et al. |

FOREIGN PATENT DOCUMENTS

| | | |
|---|---|---|
| JP | 2003-514597 A | 4/2003 |
| JP | 2008-250316 | 10/2008 |
| WO | WO 97/12272 | 4/1997 |
| WO | WO 01/35880 | 5/2001 |
| WO | WO 2004/107024 | 12/2004 |
| WO | WO 2005/055891 | 6/2005 |
| WO | WO 2007/082268 | 7/2007 |
| WO | WO 2010/129465 | 11/2010 |

OTHER PUBLICATIONS

Kenichi Yoshino, "For myopia treatment of school children", The Journal of Therapy, vol. 87, pp. 1388-1392, Mar. 2005 (with English translation).

* cited by examiner

■ Inner optic zone
▨ Outer optic zone

CONTACT LENSES FOR MYOPIC EYES AND METHODS OF TREATING MYOPIA

CROSS REFERENCE TO RELATED APPLICATION

This application is a continuation of U.S. application Ser. No. 13/581,996, filed Aug. 30, 2012, which issued as U.S. Pat. No. 8,931,897, and which is the National Phase application of International Application No. PCT/AU2011/000235, filed Mar. 3, 2011, which designates the United States and was published in English, and which claims the benefit of Australian Patent Application No. 2010900904, filed Mar. 3, 2010. These applications, in their entirety, are incorporated herein by reference.

FIELD OF THE INVENTION

The field of the invention is contact lenses for myopic eyes and methods of treating myopia. In particular, the contact lenses of the invention and associated methods are applicable to myopic eyes that are not also substantially presbyopic. Embodiments of the invention are applicable to myopic eyes in which the myopia is progressing.

BACKGROUND OF THE INVENTION

Many people suffer from myopia (short-sightedness). The prevalence of myopia is increasing, leading to increased attention to the development of solutions. In addition, for many people, myopia progresses over time, despite correction using some existing methods.

FIG. 1 shows an eye that is normal sighted (i.e. is neither long-sighted nor short-sighted). FIG. 2 shows a myopic eye viewing a distant object; the focal point of the image is located in front of the retina. This shifted focal point relative to the retina creates blur.

Several techniques have been used to correct myopia. These techniques include prescribing spectacle lenses or contact lenses or intra-ocular lenses, surgical reshaping of the cornea and temporary reshaping of the cornea by hard or soft contact lenses.

When looking at near objects, it has been observed that many individuals with myopia accommodate less than that which is needed to bring the image forward onto the retina. This under-accommodation is often referred to as a lag of accommodation. FIG. 3 shows a myopic eye with a lag of accommodation; the focal point of the image is located behind the retina. Studies involving children indicate that lag of accommodation typically increases with increasing near focus (i.e. accommodation) demand. In a study involving children of primarily European descent, lag of accommodation measured at 33 centimeters using an autorefractor found the median lag to be 1.26 D (range from −0.75 to 2.82 D) in children aged 8 to 11 yrs. In children of Chinese ethnicity, lag of accommodation measured at 33 centimeters was 0.74+/−0.27 D.

Patent publication EP 2004/005560 A1 to Radhakrishnan et al describes a method said to retard or control the progression of myopia by controlling aberrations, thereby manipulating the position of the medium and high spatial frequency peaks of a visual image in a predetermined fashion. The repositioning of medium and high spatial frequency peaks intending to alter accommodative lag. The method calls for providing an ocular system of a predetermined aberration controlled design and for the design to provide negative spherical aberration.

International patent publication WO 051055891 A1 describes the use of a contact lens to control the relative curvature of field with an objective of controlling the progression of myopia. The method includes moving peripheral images forwards relative to the retina, while allowing clear central vision.

U.S. Pat. No. 6,752,499 (Aller) describes the use of multifocal contact lenses to control the progression of myopia in myopic eyes with esofixation disparity. Aller describes providing a lens that provides for acceptable distance visual acuity and reduces or corrects esophoria at near. Aller describes use of near centre bifocal lenses having an add power of up to 2.25 D and the use of distance centre lenses with add powers of up to 2.5 D.

Multifocal and bifocal contact lenses have also been designed for presbyopic eyes.

U.S. Pat. No. 6,457,826 (Lett) describes a centre near bifocal lens and a centre distance bifocal lens. A described embodiment of a centre near bifocal lens has a constant power centre area extending to a chord diameter of 2.07 mm, a distance power outer area commencing at a chord diameter of 2.71 mm and a gradient power aspheric area that provides a continuous power transition from the centre area to the outer area. For a 3.0 mm pupil, Lett says that the near power occupies 48% of the pupil area and the distance power 18%. For a 5.0 mm pupil Lett says that the near power occupies 17% of the pupil and the distance power 71%.

U.S. Pat. No. 5,139,325 (Oksman et al) describes a lens with a vision correction power that is inversely proportional to the radial distance of the lens. In a described example, a lens has an add power over distance vision of 2.75 diopters centrally up to a radius of 0.72 mm, with the add power decreasing inversely proportional with radius after 0.72 mm. Another example has an add power over distance vision of 3.00 diopters up to a radius of 0.66 mm. The add power is described as not reaching zero unless the function is truncated.

U.S. Pat. No. 5,754,270 (Rehse et al) describes a lens with a central aspheric zone with an add power over distance vision of between 2.25 to 2.50 D up to a diameter of about 2.4 mm, a change in add power of about 0.5 to 1.25 D over the area between the diameters of 2.4 mm and 2.5 mm and then a progressive reduction in add power down to the power required for distance vision correction at about 6 mm diameter.

Reference to any prior art in the specification is not, and should not be taken as, an acknowledgment or any form of suggestion that this prior art forms part of the common general knowledge in any jurisdiction or that this prior art could reasonably be expected to be ascertained, understood and regarded as relevant by a person skilled in the art.

SUMMARY OF THE INVENTION

The invention generally relates to a contact lens and to the use of a contact lens for treating an eye with myopia.

The contact lens includes an inner optic zone and an outer optic zone. The outer optic zone includes at least a portion with a first power, selected to correct distance vision. The inner optic zone has a relatively more positive power (an add power). In some embodiments the add power is substantially constant across the inner optic zone. In other embodiments the add power is variable across the inner optic zone. While in some embodiments the inner optic zone has a power designed to substantially eliminate lag of accommodation in the eye with myopia, in other embodiments, the add power may be higher, for example up to about 4 diopters.

The reference to correction of distance vision includes providing a lens with a first power that substantially eliminates blur.

In some embodiments, the outer optic zone includes at least a portion with a third power, relatively more positive in power than the first power. The portion with a third power is distinct from the inner optic zone; the third power is separated from the inner optic zone by a portion having the first power. The third power may be substantially equal to the add power if the add power is constant or the third power may be substantially equal to the maximum add power in the inner optic zone if the add power is variable. Alternatively, the third power may be different to the second power. In some embodiments the third power is relatively more positive than the add power.

In some embodiments, the outer optic zone includes at least two portions with relatively positive power compared to the first power, separated by a portion with the first power. In some embodiments, each of said at least two portions have the same power. Alternatively, each of said at least two portions have different powers. When the powers differ, the portion with relatively more positive power may be located on the contact lens at a greater radial distance than the portion with relatively less power.

In some embodiments, the diameter of the inner optic zone and/or other add power portions of the lens is/are selected to be a maximum while still maintaining acceptable distance vision. The selection may be an iterative process, taking into account progression of myopia and the effect on distance vision of the portions of the lens with add power.

In some embodiments, the inner optic zone comprises a meridian extending across the optic zone.

In some embodiments, the inner optic zone is located off-set from the centre of the contact lens. In these embodiments the contact lens is structured to adopt an orientation when fitted to the eye so that the inner optic zone is located off-set from the centre in the nasal direction.

In some embodiments, any zone that acts to correct for the refractive error of the eye for distance may correct the refractive error to provide substantially clear distance vision.

A method of providing a contact lens for a myopic eye includes providing a lens as described above with a proportion having a power to correct distance vision and a proportion having an add power. The proportions and/or the power profile and/or the magnitude of the add power is then varied with an objective of influencing the rate of myopia progression and/or an objective of maintaining acceptable distance vision.

A range of contact lenses may be provided to allow selection of a lens with varied characteristics as described above, without having to custom manufacture a lens for an individual recipient.

Further general aspects of the invention and further embodiments of the aspects described in the preceding paragraphs will become apparent from the following description and/or from the accompanying figures.

DETAILED DESCRIPTION OF THE EMBODIMENTS

1. Introduction

As discussed briefly above, myopic eyes may experience a lag of accommodation when viewing near objects. Larger lags of accommodation may be associated with progression of myopia. Due to the lag, it is possible that when reading near texts or objects, the retina is exposed to blur or defocus (hyperopic). This blur or defocus has been theorised to act as a stimulus to eye growth.

One mechanism by which the accommodative error can be reduced is with the use of a plus lens (a lens with positive power relative to the distance power of the lens) during near viewing. The positive power serves to bring the image closer to the retina, thus reducing or eliminating the lag of accommodation. Bifocal spectacles or multifocal spectacles such as progressive addition lenses (superior zone of the lens providing for distance vision and the inferior zone carrying positive power relative to the distance zone to provide for near viewing) may be used to provide such additional positive power for near viewing.

An issue with the use of spectacle lenses is compliance whilst viewing at near objects. For the lens to be effective, the lower portion of the lens with added positive power should be used whilst looking at near objects. However, as there is no incentive to direct gaze through the lower portion of the spectacle, the patient, particularly children, may tilt their head down whilst looking at near objects and continue to use the distance portion of the lens, rather than the near portion.

In this situation, a contact lens provides for better compliance as it is aligned with the eye thus eliminating the need for eye versus head movements. Also, in the spectacle wearing situation, even in instances where the child directs gaze through the lower portion of the spectacle the gaze shift and eye movements that occur behind the spectacle make it difficult to align the appropriate power with the eye at all times. Given that the contact lens is placed on the front surface of the eye and is completely aligned with the eye movements a contact lens that has an appropriate power profile ensures that the child receives an appropriate corrective power at all viewing distances.

2. Contact Lenses with Zones of Different Power

Figure 4:
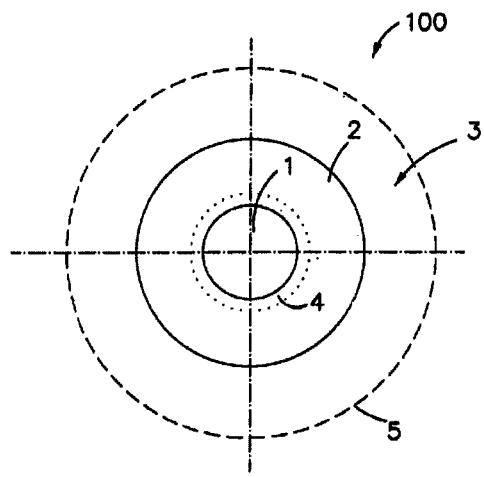
FIG. 4: shows a plan view of an embodiment of a contact lens of the present invention.

FIG. 4 shows a plan view of an embodiment of a contact lens 100 for use in correcting myopia. The lens 100 includes three zones and a transition zone. The three zones are an inner optic zone 1, an outer optic zone 2 and a peripheral zone 3. A transition zone 4 is located between the inner optic zone 1 and the outer optic zone 2. All zones are within the lens's outer peripheral edge 5, which is represented as a dashed line in FIG. 4.

Figure 5:
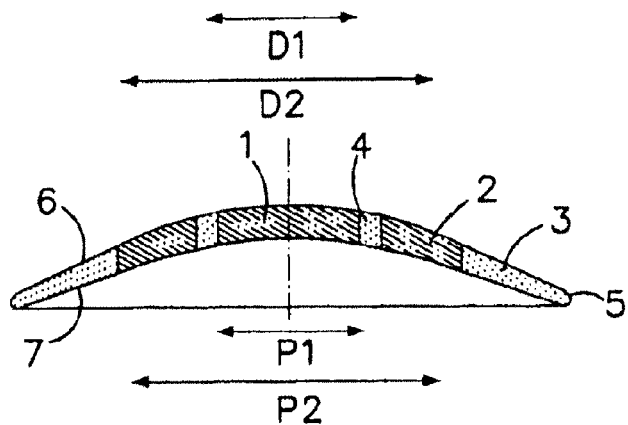
FIG. 5: shows a cross-section through the contact lens of FIG. 4.

FIG. 5 shows a cross-section through the diameter of the lens 100. In the embodiment shown the lens 100 is rotationally symmetric. Manufacture of rotationally symmetric lenses may be simpler than asymmetric lenses. However, as explained below, some embodiments of lens are asymmetrical. The lens includes an anterior surface 6 and a posterior surface 7.

The lens 100 may be either a soft or a hard corneal contact lens. For example, the lens may be a silicone-hydrogel corneal contact lens or a rigid gas permeable corneal contact lens. The lens 100 may alternatively be a corneal on-lay, provided on the cornea, below the epithelium, which may for example have been scraped away and regrown over the lens. Where the lens is a rigid contact lens or a corneal on-lay, the peripheral zone 3 may be omitted.

2.1 Dimensions and Power of the Inner Optic Zone

The diameter D1 of the inner optic zone 1 approximates or is less than the pupil diameter P1 during viewing at near distances. P1 is typically between 2 and 4 mm, depending on the recipient of the lens. The near distance may correspond to the distance where there is more than negligible or insubstantial lag of accommodation. The inner optic zone 1 may be about 10% of P1, up to about 100% of P1. However, it is expected that for many lens recipients, an appropriate diameter D1 of the inner optic zone 1 will be selected from with the range of 50% to 100% of P1.

The power of the inner optic zone 1 is relatively more positive than the refractive power of the outer optic zone 2. The differential power of the inner optic zone 1 to the outer optic zone 2 may be selected from within a range of approximately 0.5 D and 4.00 D. For example, if the outer optic zone 2 had a power of −1.50 D, then the inner optic zone may have a power from about −1.00D to 2.50 D.

In some embodiments, the power of the inner optic zone 1 is selected having regard to the lag of accommodation of the myopic eye when viewing at near distances. For example, the power may be selected to substantially reduce or to eliminate the lag of accommodation. The power may then be selected to be substantially uniform across the inner optic zone 1. This approach may be particularly appropriate when the inner optic zone 1 is larger (i.e. 50% of P1 or more). In other embodiments the power may vary across the inner optic zone 1, whether or not the inner optic zone is 50% of P1 or more and at least a portion of the add power may be more than that required to correct lag of accommodation.

Embodiments where add power of the inner optic zone is more than that required to correct the lag of accommodation may be particularly appropriate where the inner optic zone 1 is less than 50% of P1.

The selection between a smaller or larger inner optic zone 1 may be based on the pupil diameter of the recipient of the contact lens, subjective acceptance of the contact lens 100 and having regard to the required proportion of plus power zones (see below).

In the embodiments described in this specification, the inner optic zone 1 is shown as extending from the centre of the lens to a certain diameter, so as to represent a solid disc when viewed from the anterior surface of the contact lens. The inner optic zone 1 could however have another shape, other than circular, although this may increase the complexity of manufacture.

2.2 Diameter and Power of the Outer Optic Zone

The outer optic zone 2 is annular, with an inner diameter equal to D1 (when both zones are measured from a mid point in the transition zone 4) and an outer diameter D2. The outer diameter D2 approximates the pupil diameter P2 during viewing at distant objects. P2 is typically between 3 and 8 mm, depending on the patient. In other embodiments the outer optic zone 2 may be larger than P2.

The outer optic zone 2 has a refractive power chosen having regard to the myopic condition of the eye to which the contact lens 100 is to be applied. For example, in many embodiments, it is expected that the refractive power will be chosen to give the eye substantially clear distance vision. In some embodiments, the outer optic zone 2 has a substantially constant power with increasing radius. In other embodiments the outer optic zone 2 may include a plurality of sub-zones with different powers. In these other embodiments, a substantial proportion of the outer optic zone 2 is still allocated to correcting distance vision of the myopic patient.

2.3 Selecting and Adjusting Contact Lens Design Parameters

The proportion of the lens occupied by the one or more zones of add power relative to the distance correcting zones can be adjusted by adjusting any one or combination of the variables:

The size of the inner optic zone;

The power profile of the inner optic zone (e.g. whether it has substantially uniform power across its radius, or whether there is a plurality of powers across the radius, for example a smooth aspheric function or a stepwise function);

The power profile of the outer optic zone.

In some embodiments approximately 40% to 50% of the entire field of vision under normal indoor lighting conditions when the eye is viewing a distant object is allocated to correcting distance vision. In other embodiments approximately 50% to 60% is allocated to correcting distance vision. In other embodiments at least 70% is allocated to correcting distance vision.

A method of treating myopia therefore includes an iterative process of prescribing a lens with a first proportion allocated to distance vision and a second proportion allocated to one or more zones with relatively plus power. The distance vision is then evaluated and the relative proportion of distance vision correction zones and relative plus power zones changed to reach or get closer to a required proportion of plus power zones, while maintaining acceptable distance vision. The required proportion may be the maximum that still maintains acceptable distance vision.

For example, the method may include commencing with a lens with an inner optic zone of diameter D1 substantially equal to the pupil diameter when the patient is viewing near objects in normal indoor light conditions and a diameter D2 substantially equal to or greater than the pupil diameter P2 when the patient is viewing distant objects under the same light conditions. The distance vision of the patient may then be evaluated. If the distance vision is acceptable, the proportion of relative plus power may optionally be increased, by increasing the diameter of the inner optic zone and/or providing a plus power sub-zone in the outer optic zone. The distance vision of the patient may then be re-evaluated and the proportion adjusted if necessary. This process of increasing the proportion of plus power with acceptable distance vision (which may include patient acceptance) as a criteria for limiting the proportion may be adopted, for example, if the patient's myopia is progressing past a certain level and/or based on the lag of accommodation and/or based on the amount of defocus as determined at the peripheral retina. For example, the process may be adopted if the patient is progressing more than 0.5 D per year or more than 0.7 D or 0.8 D per year. If the distance vision is not acceptable, the diameter of the inner optic zone may be decreased and/or any relative plus power zone in the outer optic zone decreased in size or removed.

In addition to, or instead of varying the proportion of relative plus power zones, the relative positive power of the plus power zones may be varied, using a similar approach as described above (e.g. increasing the power of the plus power zones until a limit of acceptable distance vision is reached, perhaps less a buffer). Also, as described above the power profile may be changed, between constant and variable power across the inner optic zone and between different rates and/or magnitudes of change within the inner optic zone.

The design of a lens for a patient may be made with reference to the rate of myopia progression after an initial contact lens 100 has been fitted for a period of time, for example 3 to 6 months or 12 months. For example, the practitioner may start with a lens with an inner optic zone 1 of diameter D1 substantially equal to the pupil diameter with the patient is viewing near objects in normal indoor light conditions and a diameter D2 substantially equal to or greater than the pupil diameter P2 when the patient is viewing, distant objects. The entirety of the outer optic zone 2 is dedicated to distance vision correction. After the evaluation period has expired, the progression, if any, of myopia is measured and if this above a certain threshold, for example above an annual rate of 0.5 D (or in other embodiments more than 0.7 D or 0.8 D per year or some other rate, which may be determined as being a required reduction in the rate of progression in comparison to before the contact lens 100 was fitted), then an increased proportion of the lens may be dedicated to relative plus power and/or one or more plus power zones may be given an increased relative positive power and/or the profile of the inner optic zone may be changed, for example from the general profile of lenses L1-L3 to the general profile of lenses L4-L6 (see description below and FIG. 8).

The design of a lens for a patient is made in conjunction with the selection of the power of the lens. For instance, a practitioner may select the portion of the outer optic zone dedicated to distance vision correction to under correct the myopia, for example by about 0.5 D or about 0.25 D. It has been theorised that for at least some patients under correction may assist in reducing the rate of progression of myopia.

For example, a practitioner may:
1. Identify the myopic correction required and adjust if required, for example to under correct the myopia: this will set the power of the outer optic zone 2;
2. Identify the relative positive power required to focus the rays from a near object to an image point closer to, on, or in front of the retina: this will determine the power of the inner optic zone 1;
3. Identify the power for any relative plus power subzones in the outer optic zone 2, which may be initially selected to match the power identify in step 2.
4. Adjust the relative proportion of plus power zones to distance correction zones as described above.

After the patient has worn the lens for a period of time, the practitioner may:
5. Re-evaluate the vision of the patient and identify any correction required to the relative power and/or relative proportion of plus zones to distance correction zones;
6. Prescribe a second lens with the adjusted power profile.

The practitioner may of course continue to monitor the patient and repeat the steps described above periodically to maintain acceptable vision and in response to measured progression of myopia, if any.

Examples of the power profile are described below with reference to FIG. 8 and it will be appreciated that each of these may be modified to achieve any required proportion of zones to distance correction and zones with relatively positive power.

2.4 The Transition Zone

The transition zone 4 between the inner optic zone 1 and the outer optic zone 2 blends the inner and outer optic zones, so as to provide a continuous power profile. The transition zone 4 may be provided where there is a step wise change between the power of the peripheral part of inner optic zone 1 and the power of the inner part of the outer optic zone 2. In other embodiments where the power across the inner optic zone 1 and/or the outer optic zone 2 changes with diameter and both intersect, no separately designed transition zone 4 is necessary (the transition is an inherent part of the design). In some embodiments, the transition zone may be narrow, so that the power profile effectively includes a discontinuity.

2.5 The Peripheral Zone

The peripheral zone 3 is shaped to rest on the sclera of the eye and acts to locate and retain the contact lens 100 in place. As previously mentioned, when the contact lens 100 is a corneal on-lay, the peripheral zone 3 may be omitted.

2.6 Effect of the Contact Lens

Figure 6:
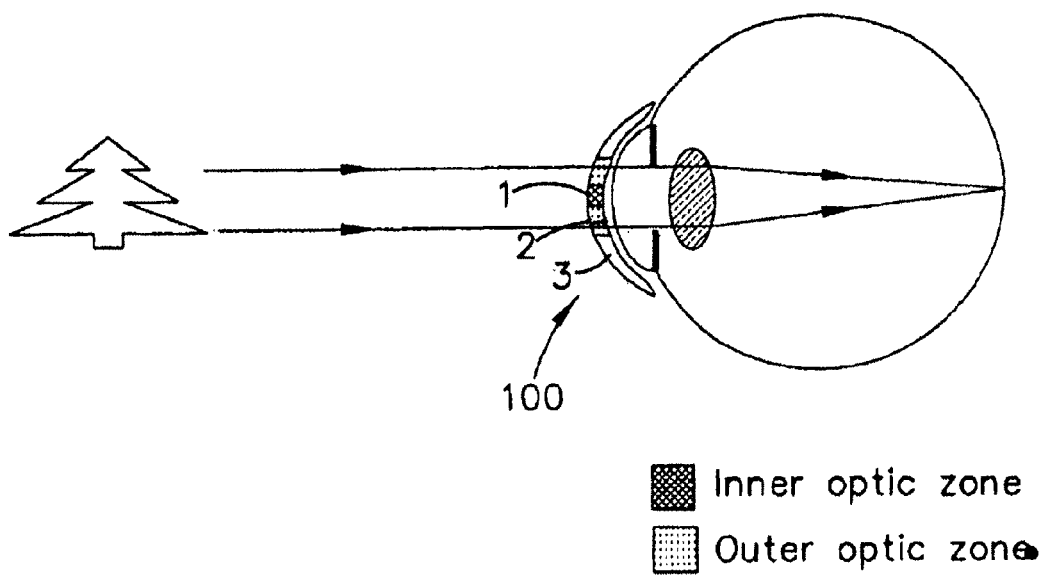
FIG. 6: shows a myopic eye viewing distant objects through the contact lens of FIG. 4.
Figure 7:
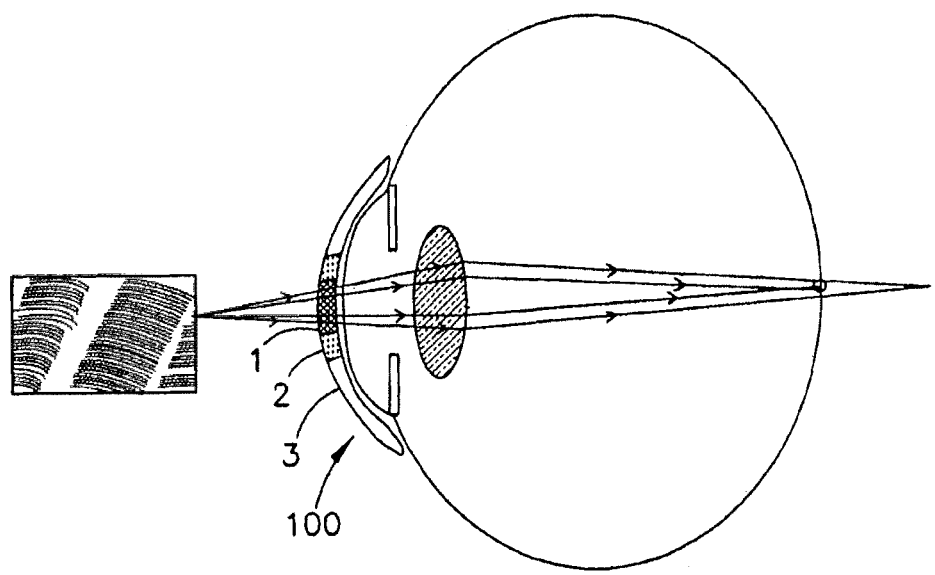
FIG. 7: shows a myopic eye viewing near objects through the contact lens of FIG. 4.

FIGS. 6 and 7 show a myopic eye viewing distant and near objects through a contact lens 100 of the type shown in FIGS. 4 and 5. In FIG. 7 the dashed lines show the path of light rays through the lens 100 and the solid lines show light rays without the lens 100 for the purposes of comparison. In this example, the lens 100 has been designed so that light from a near object passing through the central optic zone is focussed on the retina or in other words the inner optic zone 1 has been designed to eliminate the lag of accommodation by placing the image of near objects on the retina. FIGS. 6 and 7 only show light rays for the portion of the lens designed for the distance of their respective objects. In particular: FIG. 6 only considers the light rays through the portion of the outer optic zone 2 that has been designed to correct distance vision and not the relatively positive powered inner optic zone 1; FIG. 7 only considers the light rays through the portion of the inner optic zone 1 that fully corrects the lag of accommodation.

Figure 8:
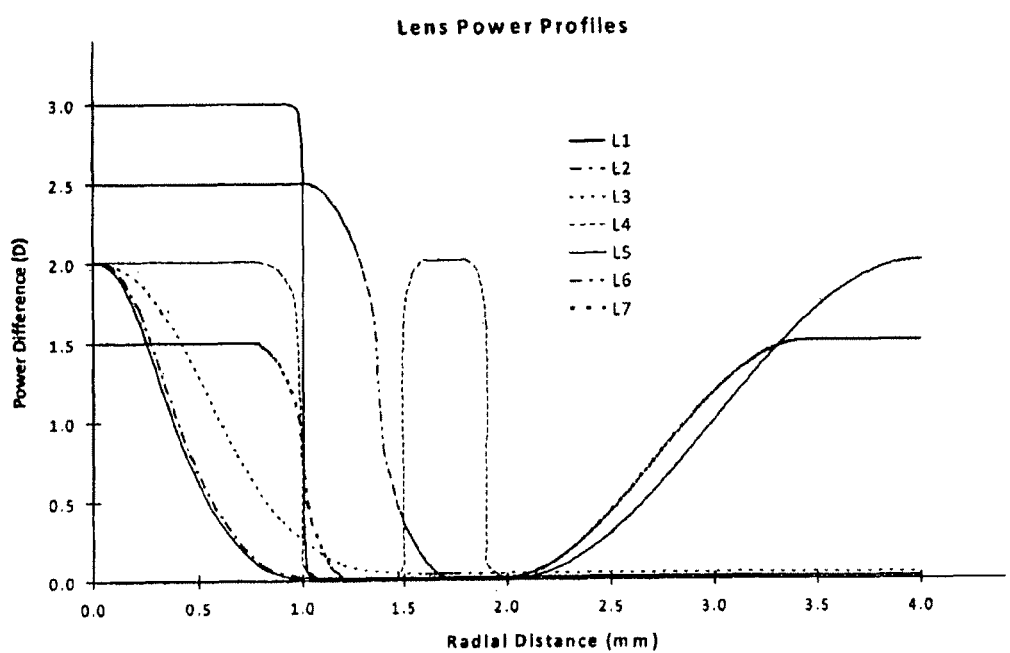
FIG. 8: shows a plot of relative power against radius for several embodiments of lens according to the present invention.

2.7 Power Profile Embodiments and Misalignment of the Pupil Centre with the Lens Centre FIG. 8 shows a graph illustrating examples of possible power profiles across the inner optic zone 1 and the outer optic zone 2, plotted against the radius of the lens. The graph has been drawn to show the power differential of the lens relative to the power required to correct the distance vision of a myopic patient. In FIG. 8, the relative power difference is plotted on the vertical axis with a unit of power in dioptres (D) and the radial distance from the lens axis (or simply radius) is plotted on the horizontal axis in millimeters. FIG. 8 shows the profiles of six different multizone lenses L1-L6, where:

L1 has an inner zone 1 with a differential power of a maximum of 2 D that peaks at the centre (radius 0 mm). The outer optic zone 2 may be viewed as commencing anywhere between a radius of about 0.5 to 1.0 mm; the two zones combine to form a continuous and relatively smooth power profile. The outer optic zone 2 includes two sub-zones: an inner sub-zone having a substantially constant power selected to correct distance vision; and an outer sub-zone with positive power differential, commencing at about a radius of 2.25 mm.

L2 Has a similar power differential profile to the lens L1, except the outer optic zone 2 is entirely dedicated to correcting distance vision.

L3 Has a similar power differential profile to the lens L2, but with a larger diameter inner zone 1 and a slower rate of change across the inner zone 1.

L4 Has an alternative near and distance 'ring' structure, including a positive power inner zone 1 of 2 D more positive power than the power required to correct distance vision. The outer optic zone 2 commences at a radius of about 1 mm. The outer optic zone 2 includes 3 sub-zones: a ring at the power to correct distance vision; a positive power ring of 2 D more positive power than the power required to correct distance vision between a radius of 1.5 mm to about 1.9 mm; and then another ring to correct distance vision. In other embodiments more rings may be provided, alternating between the power for distance correction and a relative positive power. Each ring of relative positive power may have the same power as each other ring, or the power of the rings may differ.

L5 Has an inner zone 1 of substantially constant power and which is about 2.0 mm in diameter. A narrow transition zone 4 is provided to an outer optic zone 2 and the differential power between the zones is 3 D.

L6 This lens provides a larger diameter inner zone 1 and a transition zone 4 located generally between a radius of 1.0 mm and 1.75 mm. The outer optic zone 2 has a constant power with radius.

L7 This lens provides an inner zone 1 with relatively constant power of about 1.5 D more positive than the distance vision correction. The inner zone diameter is about 2 mm (1 mm radial distance from axis). The outer optic zone is divided into an inner sub-zone between about 1 mm and 2 mm radial distance and an outer sub-zone beginning at about 2 mm radius. The inner sub-zone provides a constant power for correction of distance refractive error while the outer sub-zone repositions the peripheral image points forward by providing increasing (up to +1.5 D) peripheral power.

A lens of a configuration like lens L1 may account for possible misalignment of the pupil centre with the lens centre by still providing adequate power at all distances. For example, if the pupil centre is decentred by 1.0 mm, then when the wearer is looking at near objects the inner optic zone 1 will not be effective to provide adequate positive power. The outer sub-zone of the outer optic zone therefore provides the required difference, or at least reduces the shortfall. The positive power ring in lens L4 may also deal with misalignment of the pupil centre with the lens centre in a similar way and other embodiments of lens may include two or more positive power sub-zones that assist with near vision when the lens is not aligned with the pupil.

2.8 Rotationally Symmetric and Asymmetric Embodiments

Figure 1:
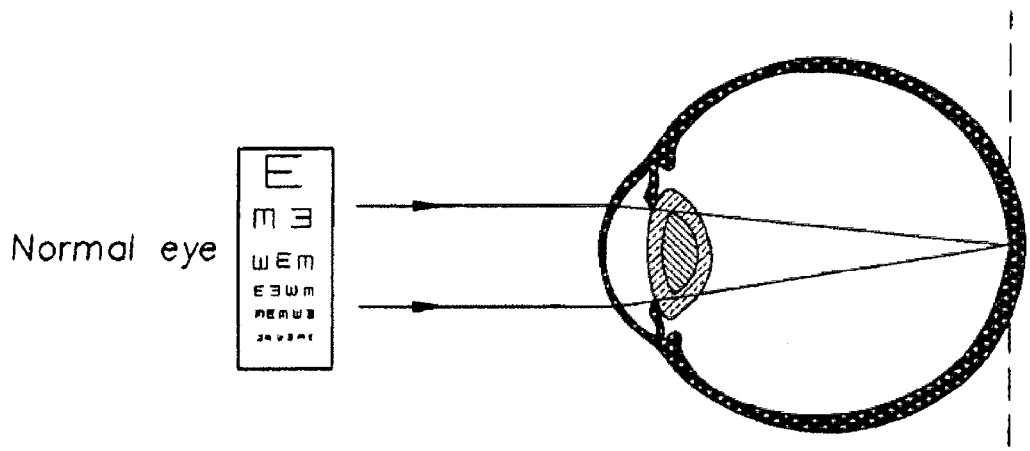
FIG. 1: shows an eye that is normal sighted.
Figure 2:
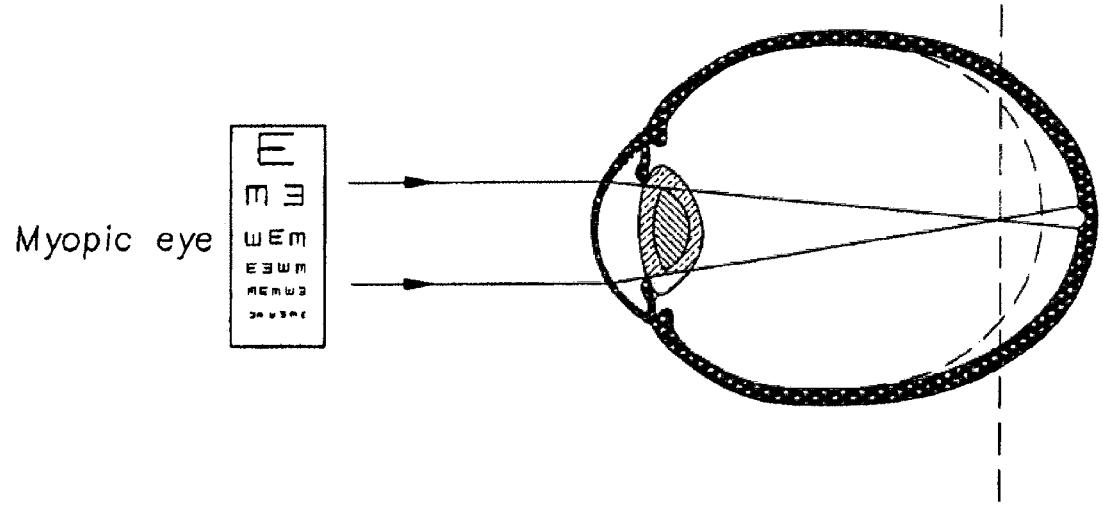
FIG. 2: shows a myopic eye viewing a distant object.
Figure 3:
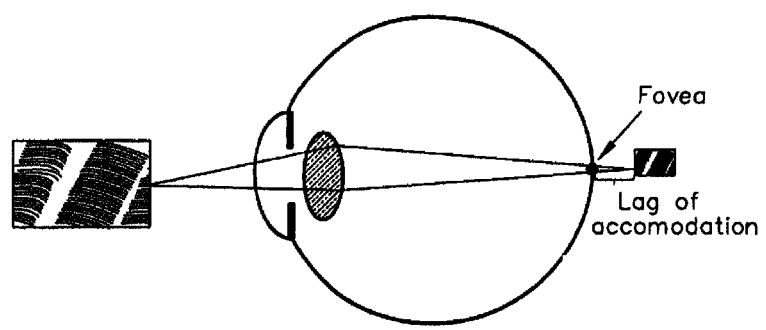
FIG. 3: shows a myopic eye with lag of accommodation.
Figure 10:
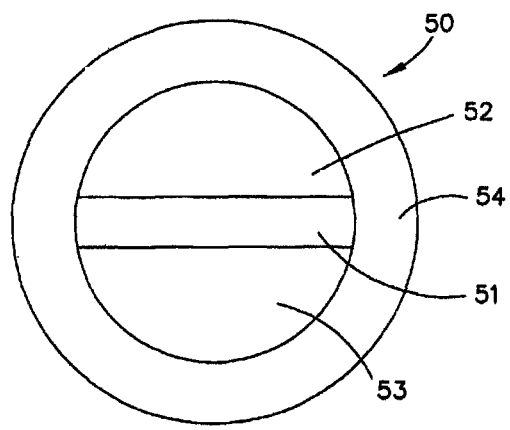
FIG. 10: shows a plan view of another, embodiment of a contact lens of the present invention.

While the foregoing description has predominantly focussed on rotationally symmetric lenses, other lens configurations may be used. For example, instead of a generally circular inner optical zone 1 (viewed from along the central/optic axis of the lens), the inner optical zone 1 may be a meridian extending across the lens. The meridian may be 0.5 to 3 mm wide, matching the diameter of the inner optical zone 1 described previously. The meridian may terminate at the peripheral zone 3. In this embodiment, the outer optical zone 2 would be two meridians, one on each side of the inner optic zone 1. FIG. 10 shows the general structure of a lens 50 of this configuration with a meridian inner optic zone 51, a first meridian outer optic zone 52, a second meridian outer optic zone 53 and a peripheral zone 54. As with the lens structure shown in FIGS. 3 and 4, the peripheral zone 54 may be omitted for a hard contact lens or corneal on-lay. The power profile along a vertical half-meridian (with reference to the orientation of the lens 50 shown in FIG. 10) may be any of the profiles described above with reference to FIG. 8.

If a lens is ballasted or otherwise formed to orient on the eye and remains in position when the eye moves, then the inner optical zone 1 may be located off-centre. This location may reflect the inward movement (towards the nose) of the pupil when viewing near objects. This movement may be about 0.5 mm.

3. Peripheral Treatment Profile

In some embodiments, the contact lens 100 is designed to provide a peripheral treatment profile.

3.1 A Peripheral Treatment Profile for Myopia

Figure 9:
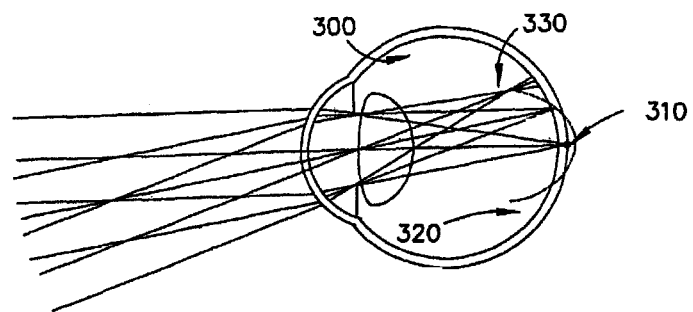
FIG. 9: shows a treatment profile for myopia of increased relative curvature of field.

A form of peripheral treatment profile for myopia is increased relative curvature of field. The lens is designed so that images coming to a focus at the peripheral retina are shifted forwards so that they come to a focus to onto or in front of the retina. The use of a contact lens to control the relative curvature of field to this end is described in international patent publication WO 05/055891 A1, the content of which is incorporated herein in its entirety. FIG. 9, which is a reproduction of FIG. 3a of WO 05/055891 A1 shows the manipulation of peripheral images, by the moving forward of the focal point in front of the retina.

3.2 Example Lenses that may Provide a Peripheral Treatment Profile

The lens L1 represented in FIG. 8 may provide a peripheral treatment profile for myopia. As previously discussed, in addition to the relatively positive power inner optic zone 1, the lens L1 has an outer optic zone 2 including an outer sub-zone with positive power differential, commencing at about a radius of 2.25 mm. Both the inner optic zone 1 and the outer sub-zone act to move peripheral images forwards. However, increased freedom of design to place peripheral images on or in front of the retina may be available with the outer sub-zone, since the inner sub-zone may be constrained by the requirement to provide clear vision at near distances.

The 'ring' design lens L4 represented in FIG. 8 may also provide a peripheral treatment profile for myopia. In this lens the ring commencing at a radius of 1.5 mm acts to shift peripheral images forwards. In other embodiments, several rings may be present, each of which move peripheral images onto or in front of the retina. The rings may be constant width or alternatively may change in width, for example with the outer rings being wider than the inner rings.

As discussed above, the relatively positive power sub-zones within the outer optic zone 2 may be useful in dealing with possible misalignment of the contact lens 1 with the pupil. In some embodiments, the relative positive power sub-zones may have a power selected to match that required to clearly focus near images. The practitioner may check whether this also places peripheral images through that part of the lens on or in front of the retina. If not, the power may be increased to achieve this objective. Alternatively, the practitioner may design the relative positive power subzones of the outer optic zone 2 with the objective of peripheral image control, substantially without regard to the power required to clearly view near objects. Where there are two or more relative positive power subzones, an inner positive power subzone may have a power that takes account of near object vision requirements and an outer subzone may have a power designed with reference to peripheral image control, for instance by having a power differential higher than that required to correct the lag of accommodation of the eye.

A practitioner may start by prescribing a lens with a power profile with a lesser area with relative positive power and then progress to lenses with increased areas of relative positive power if myopia progression is still an issue. For example, a practitioner may start by prescribing a lens that has an inner optic zone 1 with reduced diameter relative to the pupil diameter when viewing near objects and the entire outer optic zone dedicated to distance vision. If myopia is still progressing, the practitioner may increase the area of the inner optic zone 1 to approximate the pupil diameter. Next the practitioner may add a relative positive power sub-zone to the outer optic zone and may continue to increase the area of relative positive power sub-zones until either the myopia progression is halted or an unacceptable level of distance vision is reached.

As previously mentioned, different combinations of lenses may be formed, for example by combining the lens L1 with one of lenses 4 to 6 to control the position of peripheral images.

The location and shape of the relatively positive power sub-zones may be selected to avoid any image priority zones that are in or extend into the outer optic zone 2. The combination of image priority zones with peripheral image aberration is described in international patent publication WO 2007/082268 A2, the content of which is incorporated herein it its entirety. For example, referring to FIG. 8, a lens may have a power profile of the general shape of L1 along most half meridians, but have a power profile of the general shape of L2 along one half meridian, that half meridian having a width of between 0.5 mm to 3 mm.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A contact lens for myopia, the contact lens comprising an inner optic zone with a diameter of less than 2 mm, a transition zone and an outer optic zone surrounding the transition zone, the outer optic zone having at least a portion immediately adjacent said transition zone with negative power, wherein the inner optic zone has an add power portion with a substantially constant add power relative to the negative power of between 0.5 diopters and 4 diopters inclusive, and wherein the transition zone occupies a radial distance of 0.5 mm or less.

2. The corneal contact lens of claim 1, wherein the outer optic zone includes at least a portion with a third power, relatively more positive than the negative power, wherein the portion with a third power is distinct from the inner optic zone.

3. The corneal contact lens of claim 2, wherein the third power is substantially equal to the power in the add power portion.

4. The corneal contact lens of claim 2, wherein the third power is different to the power in the add power portion.

5. The corneal contact lens of claim 4, wherein the third power is greater than the power in the add power portion.

6. The corneal contact lens of claim 1 wherein the outer optic zone includes at least two portions with power greater than the power in the add power portion, separated by a portion with the first power.

7. The corneal contact lens of claim 6, wherein each of said at least two portions have the same power.

8. The corneal contact lens of claim 6, wherein each of said at least two portions have different powers.

9. The corneal contact lens of claim 8, wherein the portion with more positive power is located on the contact lens at a greater radial distance than the portion with a lesser power.

* * * * *